United States Patent

Takamiya et al.

[11] Patent Number: 5,591,517
[45] Date of Patent: Jan. 7, 1997

[54] ANTIREFLECTION FILM

[75] Inventors: Naoki Takamiya, Chiba; Makoto Nakao, Ichikawa; Akira Yazawa, Matsudo; Atumi Wakabayashi, Ichikawa, all of Japan

[73] Assignee: Sumitomo Osaka Cement Co., Ltd., Tokyo, Japan

[21] Appl. No.: 511,730

[22] Filed: Aug. 7, 1995

Related U.S. Application Data

[63] Continuation-in-part of Ser. No. 298,380, Aug. 30, 1994, abandoned.

[30] Foreign Application Priority Data

Aug. 31, 1993 [JP] Japan ............................. 5-240473
Aug. 29, 1994 [JP] Japan ............................. 6-226100

[51] Int. Cl.⁶ .................................................. B32B 3/26
[52] U.S. Cl. .......................... 428/304.4; 428/411.1; 428/412; 428/413; 428/423.1; 428/458; 428/474.4; 428/475.2; 428/480; 428/690; 428/699; 428/701; 428/702; 428/908.8; 428/913
[58] Field of Search ..................... 428/304.4, 411.1, 428/412, 413, 423.1, 458, 474.4, 475.2, 480, 690, 699, 701, 702, 908.8, 913

[56] References Cited

U.S. PATENT DOCUMENTS

| | | | |
|---|---|---|---|
| 4,583,822 | 4/1986 | Southwell | 350/164 |
| 4,590,117 | 5/1986 | Taniguchi et al. | 428/212 |
| 4,609,267 | 9/1986 | Deguchi et al. | 351/163 |
| 4,732,454 | 3/1988 | Saito et al. | 350/164 |
| 4,970,376 | 11/1990 | Mellor et al. | 219/543 |
| 5,171,414 | 12/1992 | Amberger et al. | 204/192.26 |
| 5,172,269 | 12/1992 | Ogura et al. | 359/580 |
| 5,181,141 | 1/1993 | Sato et al. | 359/580 |
| 5,190,807 | 3/1993 | Kimock et al. | 428/216 |

FOREIGN PATENT DOCUMENTS 63-4201  1/1988  Japan.
5-203804 8/1993  Japan.

Primary Examiner—Melvyn I. Marquis
Assistant Examiner—Randy Gulakowski
Attorney, Agent, or Firm—McAulay Fisher Nissen Goldberg & Kiel, LLP

[57] ABSTRACT

An antireflection film comprised of a transparent base material, a first layer with a refractive index $N_1$ of 1.45–2.10, adhered onto the base material, and a second layer with a refractive index $N_2$ at least 0.1 smaller than $N_1$, adhered onto the first layer. Thickness $D_1$ (nm) of the first layer is smaller than $0.5 \cdot L_1/N_1$, thickness $D_2$ (nm) of the second layer is smaller than $0.5 \cdot L_1/N_2$ wherein $L_1$ is a wavelength (nm) of a visible light, and at least said first layer contains a light absorber having a principal absorbing wavelength $L_2$ (nm) satisfying the formula:

$$(L_1+70) \leq L_2 \text{ or } (L_1-50) \geq L_2.$$

Alternatively, thickness $D_1$ (nm) of the first layer is between $0.5 \cdot L_1/N_1$ and $0.75 \cdot L_1/N_1$, thickness $D_2$ (nm) of the second layer is smaller than $0.5 \cdot L_1/N_2$, and at least said first layer contains a light absorber having a principal absorbing wavelength $L_2$ (nm) satisfying the formula:

$$(L_1-200) \leq L_2 \leq (L_1+200).$$

20 Claims, 6 Drawing Sheets

ANTIREFLECTION FILM

CROSS-REFERENCE TO RELATED APPLICATION

This is a continuation-in-part of application Ser. No. 08/298,380 filed on Aug. 30, 1994 abandoned.

BACKGROUND OF THE INVENTION (1) Field of the Invention

This invention relates to an antireflection film for preventing or minimizing reflection.

The antireflection film of the present invention is used for preventing or minimizing undesirable reflection of visible and other radiation in a transparent sheet of a display device such as a cathode ray tube and a liquid crystal display, an instrument board or panel, and an automobile windowpane.

(2) Description of the Related Art

Display devices such as a cathode ray tube and a liquid crystal display are widely used in industrial and other fields. The image quality in the display devices has been improved, but blurring or distortion of the image often occurs due to reflected images from lighting equipment. The transmittance of instrument panels, watch glasses and automobile front windowpanes is also influenced by reflected images.

As means for minimizing the undesirable surface reflection of display devices and other articles, attempts have heretofore been made wherein transparent antireflection films having different refractive indexes and specific thicknesses are formed on the transparent base sheet (for example, see U.S. Pat. No. 4,590,117). However, antireflection effects of a higher level are still desired in many display devices such as cathode ray tubes and liquid crystal displays.

In Japanese Unexamined Patent Publication 5-203804, an antireflection film is proposed which comprises a first transparent layer formed on a transparent base sheet and a second transparent layer formed on the first transparent layer, said first transparent layer having incorporated therein an appropriate coloring material so that the minimum spectral transmittance in the visible region and the minimum spectral reflectance are obtained at approximately the same wavelength.

With this antireflection film, a substantial antireflection effect is obtainable over a broad wavelength region. An interference color of a specific wavelength strongly develops, and thus, when a display device is watched for hours together, eye trouble is caused.

SUMMARY OF THE INVENTION

A primary object of the present invention is to provide an antireflection film which exhibits a good antireflection effect and can be produced at a reduced cost and an enhanced productivity, and which is characterized in that a strong interference color of a specific wavelength does not develop and thus, even when a display device is watched for hours together, eyesight is not impaired.

In one aspect of the present invention, there is provided an antireflection film (hereinafter referred to as "first antireflection film") comprising:

a first transparent layer adhered onto a transparent base material, which layer has a refractive index $N_1$ of 1.45 to 2.10 and a thickness $D_1$ (nm) expressed by the following formula (1):

$$0 < D_1 < 0.519 \, L_1/N_1 \quad (1),$$

and a second transparent layer adhered onto the first layer, which has a refractive index $N_2$ at least 0.1 smaller than the refractive index $N_1$ of the first transparent layer, and a thickness $D_2$ (nm) expressed by the following formula (2):

$$0 < D_2 < 0.5 \cdot L_1/N_2 \quad (2),$$

in the formulae (1) and (2), $L_1$ is a wavelength (nm) of the visible light and $N_1$ and $N_2$ are refractive indexes of the first transparent layer and the second transparent layer, respectively;

at least said first transparent layer containing at least one light absorber having a principal absorbing wavelength $L_2$ (nm) expressed by the following formulae:

$$(L_1+70) \leq L_2 \text{ or } (L_1-50) \geq L_2$$

wherein $L_1$ is as defined above.

In another aspect of the present invention, there is provided an antireflection film (hereinafter referred to as "second antireflection film") comprising:

a first transparent layer adhered onto a transparent base material, which layer has a refractive index $N_1$ of 1.45 to 2.10 and a thickness $D_1$ (nm) expressed by the following formula (3):

$$0.5 \cdot L_1/N_1 \leq D_1 < 0.75 \cdot L_1/N_1 \quad (3),$$

and a second transparent layer adhered onto the first layer, which has a refractive index $N_2$ at least 0.1 smaller than the refractive index $N_1$ of the first transparent layer, and a thickness $D_2$ (nm) expressed by the following formula (4):

$$0 < D_2 < 0.5 \cdot L_1/N_2 \quad (4),$$

in the formulae (3) and (4), $L_1$ is a wavelength (nm) of the visible light and $N_1$ and $N_2$ are refractive indexes of the first transparent layer and the second transparent layer, respectively;

at least said first transparent layer containing at least one light absorber having a principal absorbing wavelength $L_2$ (nm) expressed by the following formula:

$$(L_1-200) \leq L_2 \leq (L_1+200)$$

wherein $L_1$ is as defined above.

DETAILED DESCRIPTION OF THE PREFERRED EMBODIMENTS

It is essential in the first and second antireflection films of the present invention that the first and second transparent layers have the above-mentioned thicknesses $D_1$ and $D_2$, respectively; at least the respective first transparent layers contains at least one light absorber; and the principal absorbing wavelength $L_2$ (nm) of the light absorber is expressed by the formulae:

$$(L_1+70) \leq L_2 \text{ or } (L_1-50) \geq L_2$$

in the first antireflection film and by the formula:

$$(L_1-200) \leq L_2 \leq (L_1+200)$$

in the second antireflection film.

In the first antireflection film of the present invention, the first transparent layer has a thickness $D_1$ (nm) expressed by the formula (1):

$$0 < D_1 < 0.5 \cdot L_1/N_1 \quad (1),$$

and the second transparent layer has a thickness $D_2$ (nm) expressed by the following formula (2):

$$0 < D_2 < 0.5 \cdot L_1/N_2 \quad (2).$$

The minimum thicknesses of $D_1$ and $D_2$ are not particularly limited, but preferably the minimum thicknesses of $D_1$ and $D_2$ are 45 nm and 50 nm, respectively.

When a first transparent layer having a refractive index of 1.45 to 2.10 is formed on a transparent base material made of glass or plastic material, and a second transparent layer having a refractive index at least 0.1 smaller than the refractive index of the first transparent layer is further formed on the first transparent layer, an antireflection effect is given to some extent. However, the spectral reflectance is strongly dependent upon the wavelength, and not only a colored reflected light develops but also the reflection effect can be obtained only in a narrow wavelength range. Therefore, a good reflection-preventing or reflection-minimizing effect cannot be attained for visible light.

By incorporating a light absorber at least in the first transparent layer in addition to the above-mentioned selection of the refractive indexes of the first and second transparent layers, the intensities of reflected lights from the interface between the transparent base material and the first transparent layer, from the interface between the first and second transparent layers, and from the exposed surface of the second transparent layer are well-balanced with the results in an improvement of the spectral reflection and a reduction of the reflectivity.

It is important that at least one light absorber is incorporated at least in the first transparent layer to avoid coloration of the transmitted light and obtain the intended antireflection effect. When a light absorber is incorporated in both the first and second transparent layers, it is possible that the transmitted light is colored and the intended antireflection effect is not obtained, which is dependent on the particular combination of the first and second transparent layers. Especially, if the light absorption of the second transparent layer is larger than that of the first transparent layer, the antireflection effect is minor. Therefore, a light absorber should preferably be incorporated either only in the first transparent layer, or in both the first and second transparent layers in amounts such that the light absorption of the second transparent layer does not exceeds that of the first transparent layer.

Figure 1A:
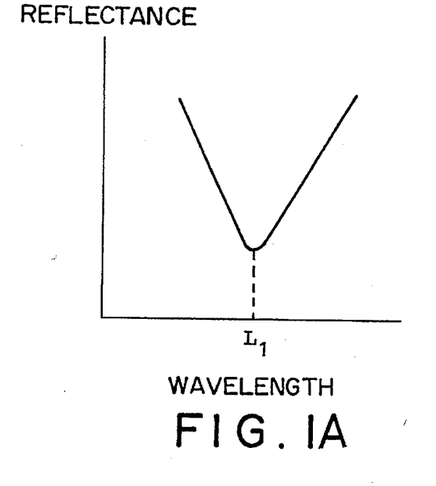
FIG. 1(a) shows a relationship of wavelength with reflectance in a transparent film containing no light absorber.
Figure 1B:
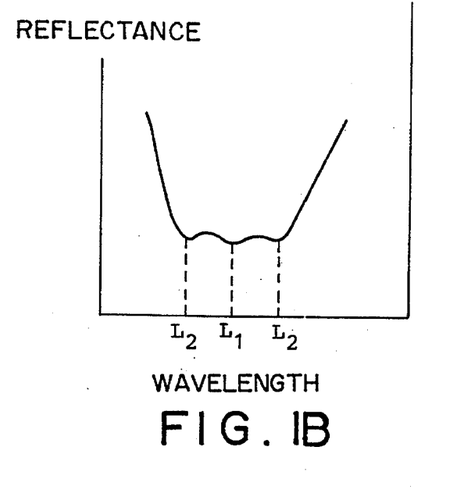
FIG. 1(b) shows a relationship of wavelength with reflectance in a transparent film which is similar to the film of FIG. 1(a), but is different in that it contains a light absorber.

Preferably, the wavelength of a light absorber incorporated in the first and second transparent layers, at which the maximum absorption is obtained, is chosen in consideration of the thickness of the first and second transparent layers. Namely, in the case where the thicknesses $D_1$ and $D_2$ of the first and second transparent layers are not far away from 0.25 L/N (nm) (wherein L is wavelength of visible light and N is refractive index of the transparent layers), a curve showing the relationship of reflectance with wavelength is of a V-shape when a light absorber is not contained in the transparent layers, as illustrated in FIG. 1(a). In this case, it is preferable that a light absorber having a principal absorption wavelength which is different from the wavelength corresponding to the bottom of the V-shaped curve is incorporated in the transparent layers. More specifically, as results of a simulation test effected in consideration of modulation of radiant energy to reduce reflectance in a wavelength region of 500 to 600 nm among the visible wavelength region, in which a high visual sensitivity is obtained, it has been found that the incorporation of a light absorber having a maximum absorption wavelength which is outside the range of 500 to 600 nm is especially effective and preferable for improving the V-shaped spectral reflection. The spectral reflection curve of an antireflection film having incorporated therein the light absorber having a maximum absorption wavelength outside the range of 500 to 600 nm is of a U-shape, the bottom portion of which is broadened, as illustrated in FIG. 1(b).

In this respect, kind and amount of a light absorber to be incorporated in the first antireflection film of the present invention must be chosen so that the principal absorbing wavelength $L_2$ of the light absorber in the antireflection film satisfy the formulae:

$$(L_1+70) \leq L_2 \text{ or } (L_1-50) \geq L_2.$$

When this requirement is satisfied, a strong interference color of a specific wavelength does not develop and thus, even when a display device is watched for hours together, an eye trouble is not caused.

Especially, when the principal absorption wavelength $L_2$ is in the range of from 400 to 800 nm, the intended improvement of spectral reflection is prominently manifested. More preferably, $L_2$ is in the range of from 570 to 740 nm, and most preferably from 620 to 680 nm. For example, in the case where Phthalocyanine Blue is used as a light absorber, the improvement of spectral reflection is manifested at an absorbance of at least about 0.009 abs. and prominently manifested at an absorbance of at least about 0.022 abs.

In the second antireflection film of the present invention, the first transparent layer has a thickness $D_1$ (nm) represented by the formula (3):

$$0.5 \cdot L_1/N_1 \leq D_1 < 0.75 \cdot L_1/N_1 \qquad (3),$$

and the second transparent layer has a thickness $D_2$ (nm) represented by the following formula (4):

$$0 < D_2 < 0.5 \cdot L_1/N_2 \qquad (4).$$

The minimum thickness of $D_2$ is not particularly limited, but preferably the minimum thickness is 50 nm.

Figure 2A:
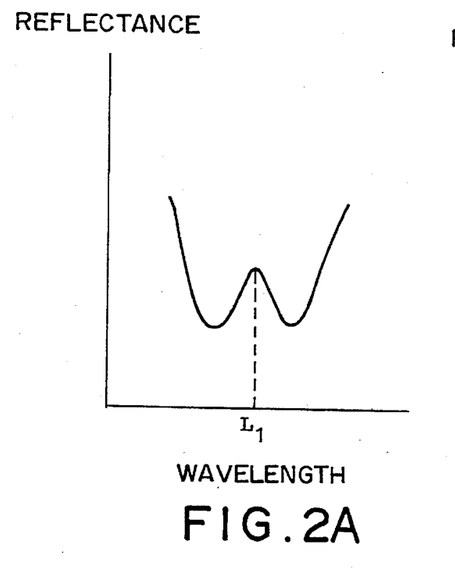
FIG. 2(a) shows a relationship of wavelength with reflectance in another transparent film containing no light absorber.
Figure 2B:
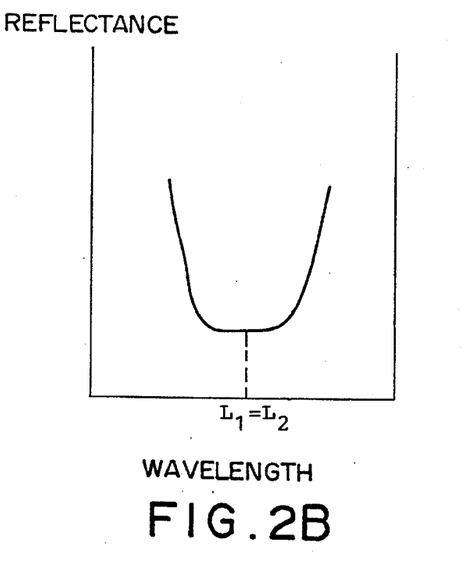
FIG. 2(b) shows a relationship of wavelength with reflectance in a transparent film which is similar to the film of FIG. 2(a), but is different in that it contains a light absorber.

If the second antireflection film does not contain a light absorber, the spectral reflection curve of the antireflection film is of a W-shape as illustrated in FIG. 2 (a). It now has been found that, when a light absorber is incorporated in the antireflection film so that the antireflection film exhibits a maximum absorption at a wavelength in the range of from $(L_1-200)$ nm to $(L_1+200)$ nm, the antireflection effect is improved. The spectral reflection curve of the light absorber incorporated antireflection film is shown in FIG. 2(b).

Thus, in the second antireflection film of the present invention, kind and amount of a light absorber to be incorporated must be chosen so that the principal absorption wavelength $L_2$ (nm) of the light absorber in the antireflection film is in the range of from $(L_1-200)$ to $(L_1+200)$.

In the first reflection film of the present invention and the second reflection film thereof, where two or more light absorbers are incorporated in the first or second antireflection film, the light absorber exhibiting the largest light absorption among the two or more light absorbers must satisfy the above-mentioned requirements for the principal absorbing wavelength $L_2$.

As the materials for preparing the first and second transparent layers of the antireflection film of the present invention, materials, which have a refractive index and a maximum absorption wavelength, satisfying the above-mentioned requirements, and which are capable of forming a transparent film, are used. As examples of such materials, there can be mentioned inorganic compounds such as a silica compound, porous silica, a titanium compound, a tin compound, an indium compound, a zirconium compound, and organic materials such as an acrylic resin, a polyester resin, a vinyl chloride resin and an epoxy resin. These materials may be used either alone or in combination.

As specific examples of the light absorber, which is incorporated at least in the first transparent layer of the antireflective film of the present invention, there can be mentioned organic and inorganic pigments such as monoazo pigment, quinacridone, Iron Oxide Yellow, dis-azo pigment, phthalocyanine Green, Phthalocyanine Blue, Cyanine Blue, Flavanthrone Yellow, Dianthraquinolyl Red, Indanthrone Blue, Thiondigo Bordeaux, Perinone Orange, Perillene Scarlet, Perillene Red 178, Perillene Maroon, Dioxazine Violet, Isoindolinone Yellow, Quinophthalone Yellow, Isoindoline Yellow, nickel nitroso yellow, Madder Lake, Copper Azomethine Yellow, Aniline Black, Alkali Blue, zinc oxide, titanium oxide, red oxide, chromium oxide, iron black, titanium yellow, cobalt blue, cerulean blue, cobalt green, alumina white, viridian, cadmium yellow, cadmium red, red mercuric sulfide, lithopone, chrome yellow, molybdate orange, zinc chromate, calcium sulfate, barium sulfate, calcium carbonate, basic red carbonate, ultramarine blue, manganese violet, cobalt violet, emerald green, Prussian blue, carbon black, a metal powder, and dyes such as azo dye, anthraquinone dye, indigoid dye, phthalocyanine dye, carbonium dye, quinoneimine dye, methine dye, quinoline dye, nitro dye, nitroso dye, benzoquinone dye, naphthoquinone dye, naphthalimide dye and perinone dye. These light absorbers may be used either alone or in combination.

Light absorbance A of a light absorber is expressed by the formula:

$$A = \log_{10}(I_0/I) = \epsilon CD$$

wherein $I_0$ is incident light,

I is transmitted light,

C is color strength,

D is optical distance (film thickness) and $\epsilon$ is molar absorptivity.

In general, a light absorber having a molar absorptivity larger than $10^4$ is used in the antireflection film of the present invention. Preferably, light absorbance $A_1$ of the first transparent layer is from 0.0005 to 3 abs. and the light absorbance $A_2$ of the second transparent layer is not larger than 3 abs. When these requirements are satisfied, the transparency or the antireflection effect is liable to be reduced.

Various materials can be incorporated in the first and second transparent layers of the antireflection film provided that the object of the present invention can be attained. For example, at least one powder selected from an antimony-doped tin oxide powder and a tin-doped indium oxide powder can be incorporated in at least one of the first and second transparent layers to afford an antireflection film which has good antistatic properties and a high density and is capable of reducing scattering of visible light. These benefits are enhanced if the transparent layers are formed by a coating method.

To enhance the antireflection effect, a black light absorber such as carbon black or other black pigments may be further contained either only in the first transparent layer or both in the first and second transparent layers in an amount such that the light transmittance of the black light absorber-incorporated antireflection film is at least 40% of the light transmittance of the antireflection film having not incorporated therein the black light absorber.

Preferably, the second transparent layer of the antireflection film contains porous silica. More preferably, the porous silica has an average particle diameter of 0.3 to 100 nm and a refractive index of 1.2 to 1.4. By the incorporation of porous silica, the second transparent layer has a low refractive index and exhibits a reflection-reducing effect.

The particle diameter of the material for forming the first and second transparent layers and the particle diameter of the light absorber are not particularly limited, provided that the particle diameters are not larger than the respective transparent layers. However, the particle diameters are preferably not larger than 100 nm to afford an antireflection film capable of reducing scattering of visible light and having a high density. The dependency of transparency and refractive index upon particle diameter is shown in Table 1 with reference to films prepared by coating a transparent base material with antimony-doped tin oxide particles of various particle diameters without using a binder.

TABLE 1

| Particle diameter of antimony-doped tin oxide (nm) | Transparency | Refractive index |
|---|---|---|
| 1,000 | Poor (whitened) | Impossible to measure |
| 500 | Poor (whitened) | Impossible to measure |
| 200 | Not good (slightly whitened) | 1.50 |
| 100 | Good | 1.65 |
| 50 | Good | 1.70 |
| 30 | Good | 1.70 |

The antireflection film of the present invention can be formed on various transparent base materials made of inorganic glass or an organic plastic material, which include, for example, display devices such as a television cathode ray tube and a liquid crystal display, an instrument panel or board, a watch glass, and an automobile windowpane.

The antireflection film of the present invention can be formed by conventional methods. For example, a sputtering method, a vapor deposition method and a coating method. Of these, a coating method is preferable because of a low cost and simplicity. Especially, spray coating, spin coating, dipping and gravure coating methods are preferable. The conditions for forming the antireflection film, such as heating temperature and heating time, may be chosen according to the conventional coating techniques.

The present invention will now be specifically described by the following examples that by no means limit the scope of the invention.

Characteristics of a multi-layer transparent material comprising a transparent base material and an antireflection two-layer film of the invention were evaluated as follows.

Surface resistivity was measured by using a four terminal surface resistance meter (Model HCP-HT250 supplied by Mitsubishi Petrochemical Co.).

Total luminous transmittance and haze were measured by using a haze meter (Model TC-HIIIDP supplied by Tokyo Denshoku K.K.).

Surface reflectivity was measured by utilizing specular reflection at an incidence angle of 5 degrees and using a spectrophotometer.

Adhesion between the two layers of the antireflection film was evaluated according to MIL-C-675C employing a rubber eraser testing method wherein a rubber eraser (No. 50, supplied by Lion K.K.) pressed on the surface of the antireflection film at a load of 1 kgf was reciprocated 20 times, and it was observed whether the surface is marred or not.

EXAMPLE 1

(1) Preparation of Liquid (a) for Forming Light Absorber-containing Highly Refractive Film In a solution composed of 53.98 g of ethanol, 40 g of ethyl cellosolve, 4 g of water, 0.08 g of hydrochloric acid and 0.34 g of acetylacetone, were incorporated 0.59 g of a finely divided powder of antimony-doped tin oxide (supplied by Sumitomo Cement Co.), 0.05 g of a finely divided blue pigment powder (trade name: Cyanine Blue BNRS, supplied by Toyo Ink Mfg. Co.) and 0.96 g of titanium isopropoxide. The mixture was treated by an ultrasonic homogenizer (Sonifier 450 supplied by Central Scientific Trade Co.) for 10 minutes to obtain a uniform dispersion (a).

(2) Preparation of Coating Solution (b) for Forming Lowly Refractive Film

A mixture of 0.8 g of tetraethoxysilane, 0.01 g of hydrochloric acid, 98.39 g of ethyl alcohol and 0.8 g of water was thoroughly stirred to obtain a uniform solution (b).

(3) Preparation of Multi-layer Transparent Material Having Antireflection Two-layer Film A glass plate was coated with the coating liquid (a) by a spin coating method at a plate temperature of 40° C., and the coating was dried in an air stream at a temperature of 50° C. for one minute whereby a light absorber containing highly refractive film having a thickness of 0.084 μm was formed.

The exposed surface of the light absorber-containing highly refractive film was coated with the coating solution (b) at a temperature of 40° C. by a spin coating method, and the coating was dried in an air stream at a temperature of 50° C. and baked at a temperature of 160° C. for 20 minutes whereby a lowly refractive film having a thickness of 0.098 μm was formed on the light absorber-containing highly refractive film.

Figure 3:
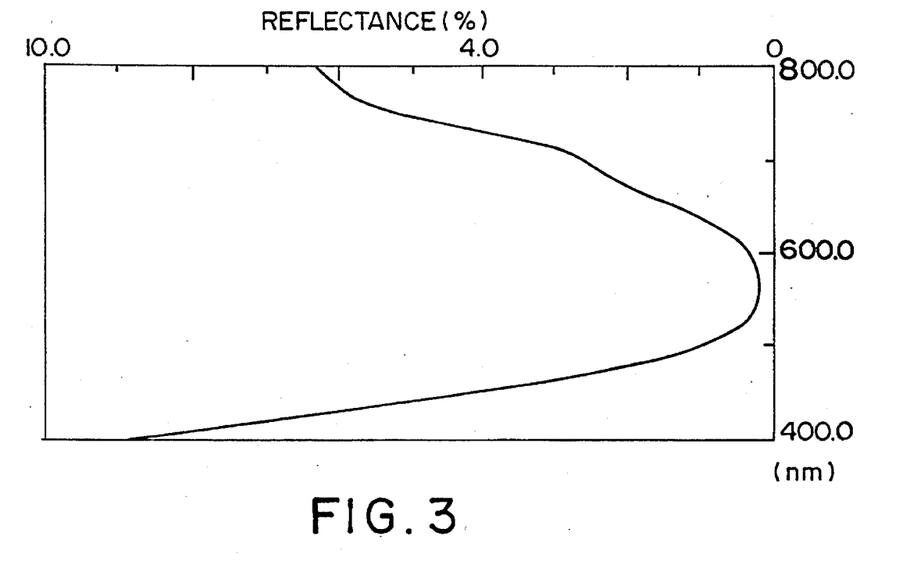
FIG. 3 is a spectral reflection curve of an antireflection film of the present invention.

(4) Evaluation of Characteristics of Multi-layer Transparent Material with Antireflection Two-layer Film Characteristics of the multi-layer transparent material having the antireflection two-layer film were evaluated. The results are shown in Table 2, and the spectral reflection curve of the antireflection film is shown in FIG. 3.

EXAMPLE 2

A multi-layer transparent material having an antireflection two-layer film was prepared and evaluated by the same procedures as described in Example 1 wherein the solid components in the coating liquid for forming the light absorber-containing highly refractive film were composed of 0.04 g of the blue pigment, 0.04 g of a black pigment (carbon black, trade name: MA-100 supplied by Mitsubishi Kasei Corp.), 0.68 g of titanium oxide (titanium isopropoxide) and 0.83 g of antimony-doped tin oxide (the weight ratio of the respective solid components is 4/4/17/75), and the amounts of acetylacetone and ethanol used for the preparation of the coating liquid were changed to 0.24 g and 54.08 g, respectively.

Figure 4:
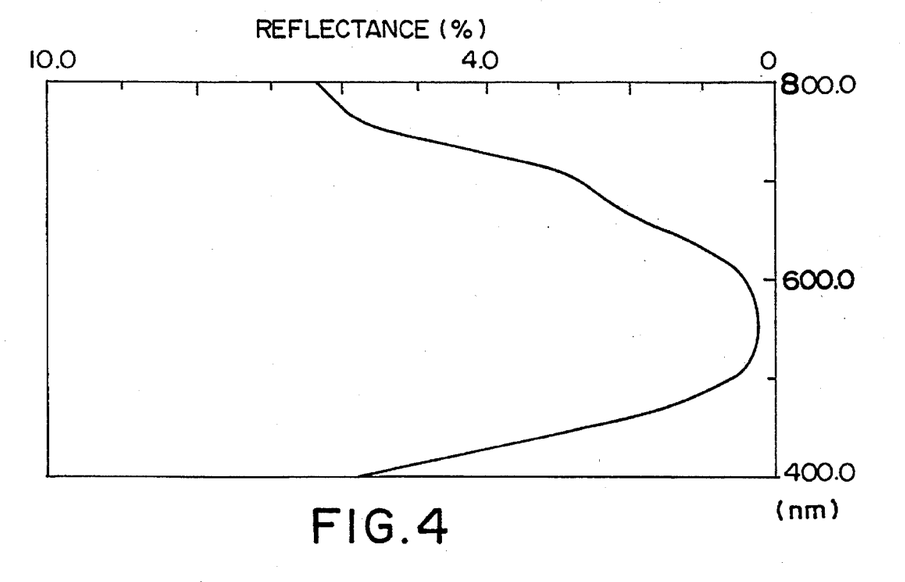
FIG. 4 is a spectral reflection curve of another antireflection film of the present invention.

The evaluation results are shown in Table 2, and the spectral reflection curve of the antireflection two-layer film was shown in FIG. 4.

COMPARATIVE EXAMPLE 1

A multi-layer transparent material having an antireflection two-layer film was prepared and evaluated by the same procedures as described in Example 1 wherein a light absorber was not incorporated in the coating liquid for forming the highly refractive film, the solid components in the coating liquid were composed of 0.76 g of titanium oxide (titanium isopropoxide) and 0.89 g of antimony-doped tin oxide (the weight ratio of the respective solid components is 19/81), and the amounts of acetylacetone and ethanol used for the preparation of the coating liquid were changed to 0.27 g and 54.0 g, respectively.

Figure 5:
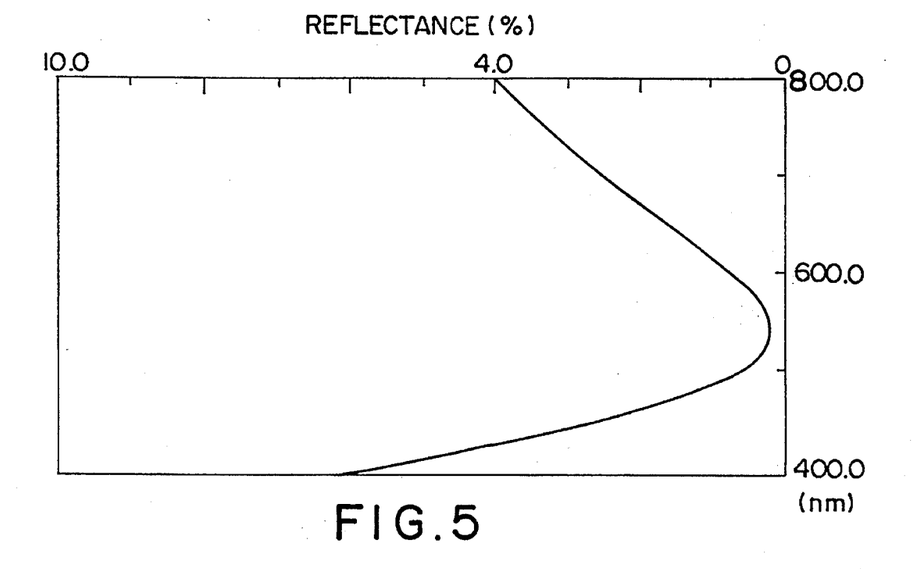
FIG. 5 is a spectral reflection curve of an antireflection film of comparative example.

The evaluation results are shown in Table 2, and the spectral reflection curve of the antireflection film was shown in FIG. 5.

EXAMPLE 3

A multi-layer transparent material having an antireflection two-layer film laminate was prepared and evaluated by the same procedures as described in Example 1 wherein the solid components in the coating liquid for forming the light absorber-containing highly refractive film were composed of 0.054 g of the blue pigment, 0.066 g of a black pigment (carbon black, trade name: MA 100 supplied by Mitsubishi Kasei Corp.), and 1.88 g of antimony-doped tin oxide (the weight ratio of the respective solid components is 2.7/3.3/94). Namely, the light absorber-containing highly refractive film was prepared as follows. A mixture of 1.88 g of a finely divided antimony-doped tin oxide powder (supplied by Sumitomo Cement Co.), 0.066 g of a finely divided black pigment powder (carbon black, trade name: MA-100 supplied by Mitsubishi Kasei Corp.) and 0.054 g of a finely divided blue pigment powder (trade name: Cyanine Blue BNRS, supplied by Toyo Ink Mfg. Co.) was incorporated in a solution composed of 97.99 g of water and 0.01 g of a surface active agent (silicone surfactant, trade name: L-77 supplied by Nippon Unika Co.), and the resulting mixture was treated by an ultrasonic homogenizer for 10 minutes to obtain a uniform dispersion.

The coating solution for preparing the lowly refractive film was prepared by mixing 0.54 g of tetramethoxysilane, 0.36 g of porous silica (supplied by Sumitomo Cement Co.) and 0.6 g of 0.1N hydrochloric acid and 98.5 g of ethyl alcohol.

Figure 6:
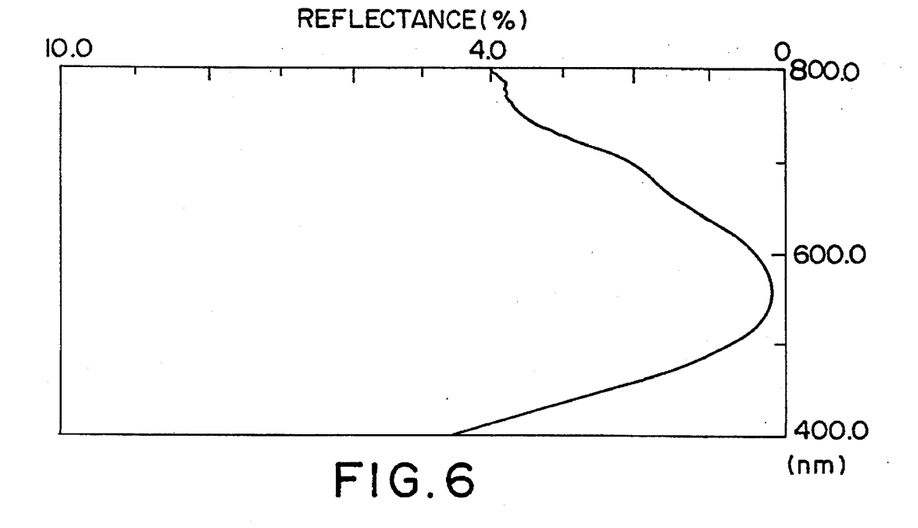
FIG. 6 is a spectral reflection curve of still another antireflection film of the present invention.

The evaluation results are shown in Table 2, and the spectral reflection curve of the antireflection film was shown in FIG. 6.

EXAMPLE 4

A multi-layer transparent material having an antireflection two-layer film laminate was prepared and evaluated by the same procedures as described in Example 3 wherein the coating solution for preparing the lowly refractive film was prepared by mixing 0.8 g of tetramethoxysilane, 0.2 g of porous silica (supplied by Sumitomo Cement Co.) and 0.9 g of 0.1N hydrochloric acid and 98.1 g of ethyl alcohol.

Figure 7:
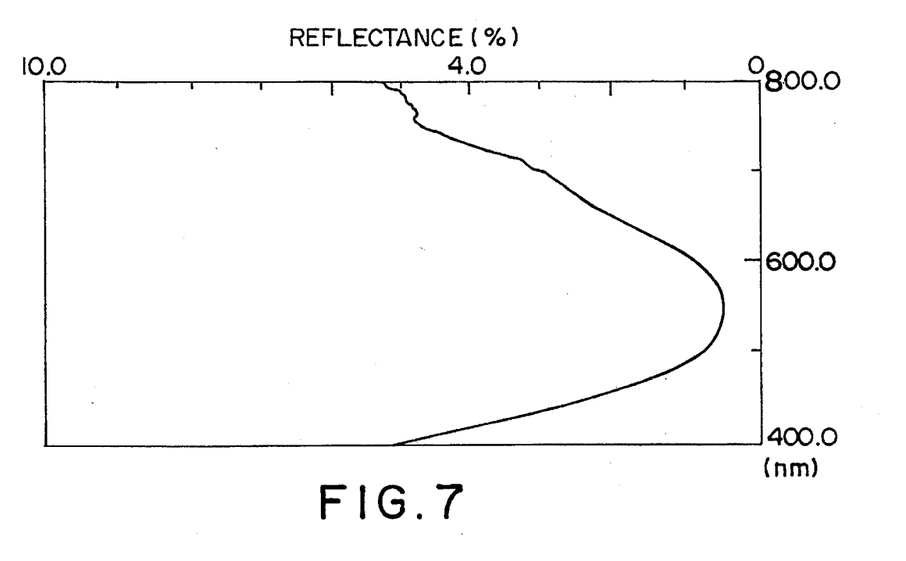
FIG. 7 is a spectral reflection curve of a further antireflection film of the present invention.

The evaluation results are shown in Table 2, and the spectral reflection curve of the antireflection film was shown in FIG. 7.

EXAMPLE 5

A multi-layer transparent material having an antireflection two-layer film laminate was prepared and evaluated by the same procedures as described in Example 3 wherein the coating solution for preparing a light absorber-containing lowly refractive film was prepared by mixing 0.76 g of tetramethoxysilane, 0.2 g of porous silica (supplied by Sumitomo Cement Co.), 0.04 g of a yellow dye (trade name: Astrazon Yellow, supplied by Bayer A. G. leverkusen) and 0.9 g of 0.1N hydrochloric acid and 98.1 g of ethyl alcohol.

Figure 8:
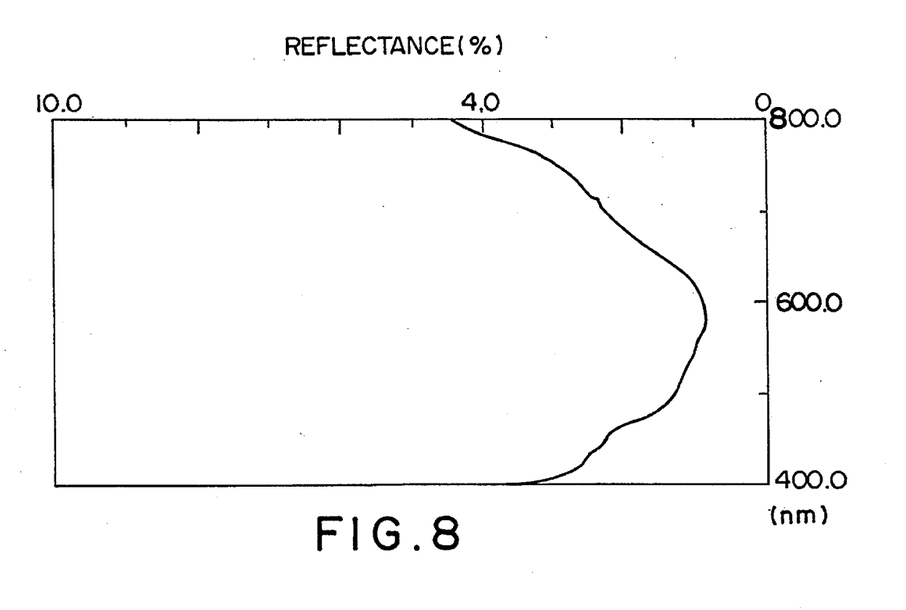
FIG. 8 is a spectral reflection curve of a further antireflection film of the present invention.

The evaluation results are shown in Table 2, and the spectral reflection curve of the antireflection film was shown in FIG. 8.

EXAMPLE 6

A multi-layer transparent material having an antireflection two-layer film laminate was prepared and evaluated by the same procedures as described in Example 1 wherein the solid components in the coating liquid for forming the light absorber-containing highly refractive film were made of 0.05 g of a blue pigment (Cyanine Blue BNRS, supplied by Toyo Ink Mfg. Co.), 0.32 g of titanium isopropoxide and 0.85 g of antimony-doped tin oxide (supplied by Sumitomo Osaka Cement Co.) (the weight ratio of the respective solid components is 5/10/85), and the amounts of acetylacetone and ethanol used for the preparation of the coating liquid were changed to 0.11 g and 54.7 g, respectively.

Figure 9:
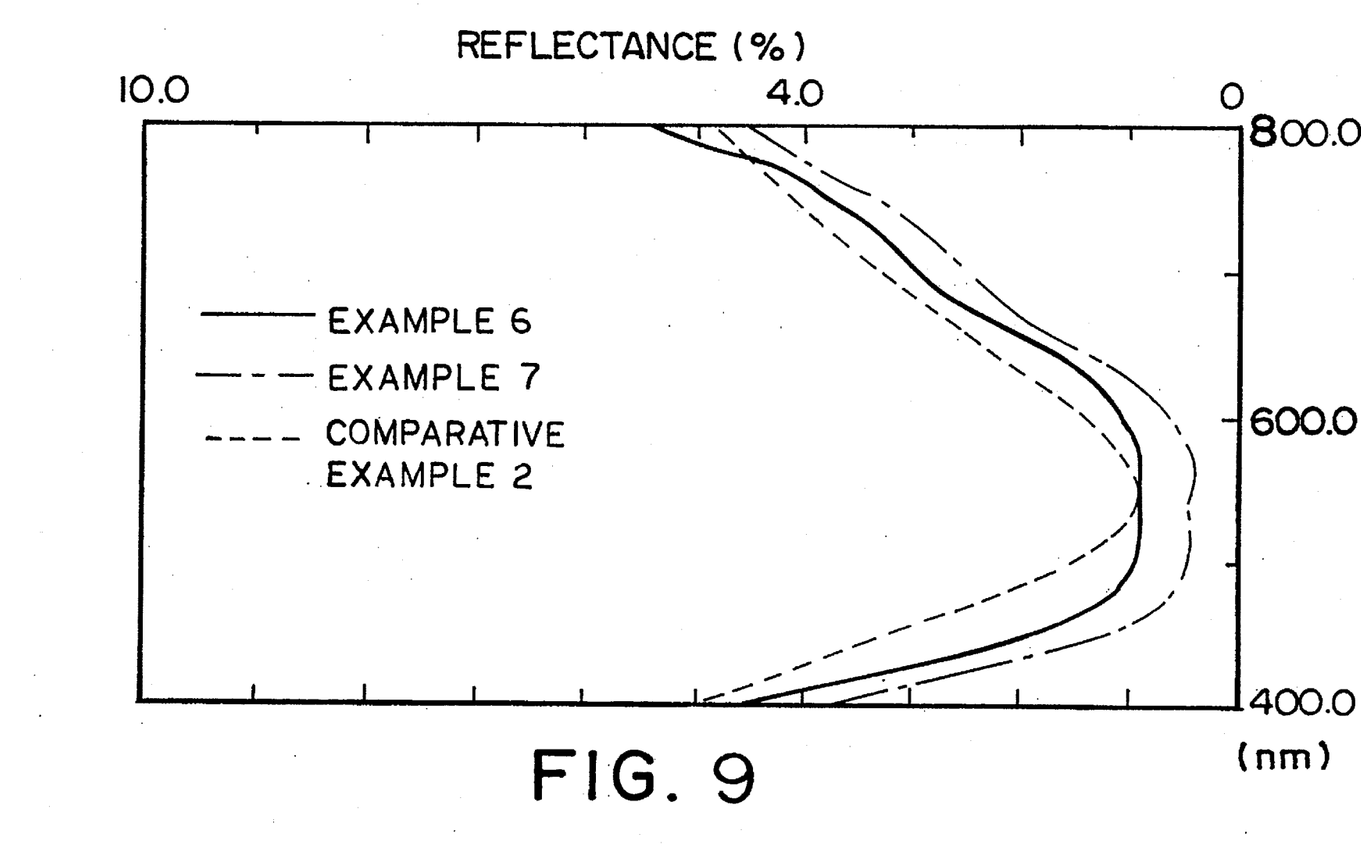
FIG. 9 is spectral reflection curves of further antireflection films of the present invention and another antireflection film of comparative example; and, FIG. 10 is spectral reflection curves of further antireflection films of the present invention and still another antireflection film of comparative example.

The evaluation results are shown in Table 2, and the spectral reflection curve of the antireflection film is shown in FIG. 9.

EXAMPLE 7

A multi-layer transparent material having an antireflection two-layer film laminate was prepared and evaluated by the same procedures as described in Example 1 wherein the solid components in the coating liquid for forming the light absorber-containing highly refractive film were made of 0.05 g of a blue pigment (Cyanine Blue BNRS, supplied by Toyo Ink Mfg. Co.), 0.05 g of a black pigment (carbon black, MA-100 supplied by Mitsubishi Chemical Corp.), 0.32 g of titanium isopropoxide and 0.80 g of antimony-doped tin oxide (supplied by Sumitomo Osaka Cement Co.) (the weight ratio of the respective solid components is 5/5/10/80), and the amounts of acetylacetone and ethanol used for the preparation of the coating liquid were changed to 0.11 g and 54.59 g, respectively.

The evaluation results are shown in Table 2, and the spectral reflection curve of the antireflection film is shown in FIG. 9.

COMPARATIVE EXAMPLE 2

A multi-layer transparent material having an antireflection two-layer film laminate was prepared and evaluated by the same procedures as described in Example 1 wherein a light absorber was not incorporated in the coating liquid for forming the highly refractive film, the solid components in the coating liquid for forming the highly refractive film were made of 0.32 g of titanium isopropoxide and 0.90 g of antimony-doped tin oxide (supplied by Sumitomo Osaka Cement Co.) (the weight ratio of the respective solid components is 10/90), and the amounts of acetylacetone and ethanol used for the preparation of the coating liquid were changed to 0.11 g and 54.59 g, respectively.

The evaluation results are shown in Table 2, and the spectral reflection curve of the antireflection film is shown in FIG. 9.

EXAMPLE 8

A multi-layer transparent material having an antireflection two-layer film laminate was prepared and evaluated by the same procedures as described in Example 1 wherein the solid components in the coating liquid for forming the light absorber-containing highly refractive film were made of 0.1 g of a violet pigment (Rionogen Violet R6100, supplied by Toyo Ink Mfg. Co.), 0.64 g of titanium isopropoxide and 1.7 g of antimony-doped tin oxide (supplied by Sumitomo Osaka Cement Co.) (the weight ratio of the respective solid components is 5/10/85), and the amounts of acetylacetone and ethanol used for the preparation of the coating liquid were changed to 0.22 g and 53.26 g, respectively.

Figure 10:
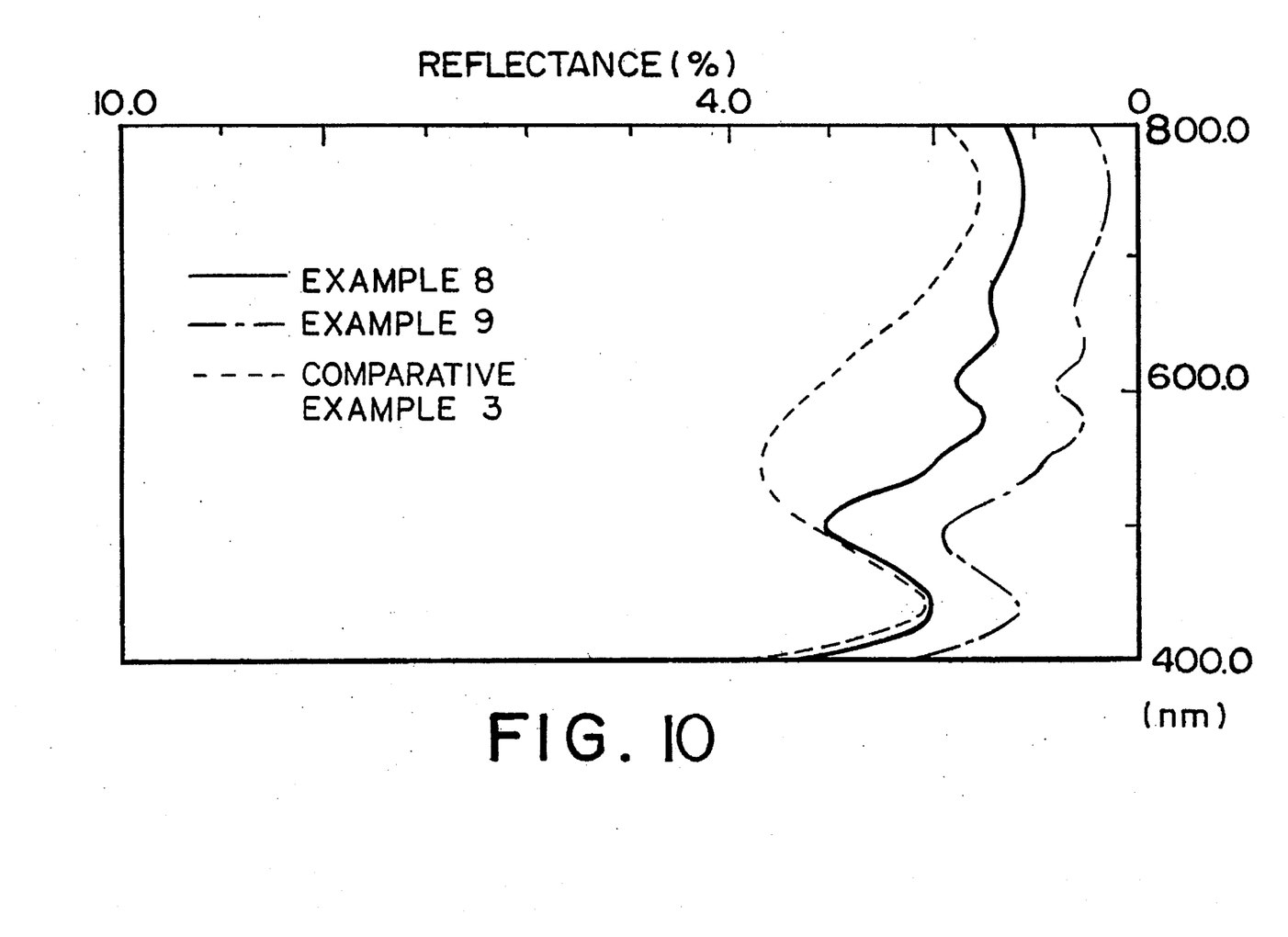

The evaluation results are shown in Table 2, and the spectral reflection curve of the antireflection film is shown in FIG. 10.

EXAMPLE 9

A multi-layer transparent material having an antireflection two-layer film laminate was prepared and evaluated by the same procedures as described in Example 1 wherein the solid components in the coating liquid for forming the light absorber-containing highly refractive film were made of 0.1 g of a violet pigment (Rionogen Violet R6100, supplied by Toyo Ink Mfg. Co.), 0.1 g of a black pigment (carbon black, MA-100 supplied by Mitsubishi Chemical Corp.), 0.64 g of titanium isopropoxide and 1.6 g of antimony-doped tin oxide (supplied by Sumitomo Osaka Cement Co.) (the weight ratio of the respective solid components is 5/5/10/80), and the amounts of acetylacetone and ethanol used for the preparation of the coating liquid were changed to 0.22 g and 53.26 g, respectively.

The evaluation results are shown in Table 2, and the spectral reflection curve of the antireflection film is shown in FIG. 10.

COMPARATIVE EXAMPLE 3

A multi-layer transparent material having an antireflection two-layer film laminate was prepared and evaluated by the same procedures as described in Example 1 wherein a light absorber was not incorporated in the coating liquid for forming the highly refractive film, the solid components in the coating liquid for forming the highly refractive film were made of 0.64 g of titanium isopropoxide and 1.8 g of antimony-doped tin oxide (supplied by Sumitomo Osaka Cement Co.) (the weight ratio of the respective solid components is 10/90), and the amounts of acetylacetone and ethanol used for the preparation of the coating liquid were changed to 0.22 g and 53.26 g, respectively.

The evaluation results are shown in Table 2, and the spectral reflection curve of the antireflection film is shown in FIG. 10.

smaller than the refractive index $N_2$ of the first transparent layer, and a thickness $D_2$ (nm) expressed by the following formula (2):

$$0 < D_2 < 0.5 \cdot L_1/N_2 \qquad (2),$$

(in the formulae (1) and (2), $L_1$ is a wavelength in the range of 400 to 800 nm and $N_1$ and $N_2$ are refractive indexes of the first transparent layer and the second transparent layer, respectively);

at least said first transparent layer containing at least one light absorber having a principal absorbing wavelength $L_2$ (nm) expressed by the following formulae:

$$(L_1+70) \leq L_2 \text{ or } (L_1-50) \geq L_2$$

wherein $L_1$ is as defined above, and the light absorption of said second layer does not exceed that of said first layer.

2. An antireflection film as claimed in claim 1, wherein the principal absorbing wavelength $L_2$ (nm) is in a range expressed by the following formula (5):

$$400 \leq L_2 \leq 800 \qquad (5).$$

3. An antireflection film as claimed in claim 2, wherein the second transparent layer comprises porous silica.

4. An antireflection film as claimed in claim 3, wherein the second transparent layer comprises porous silica.

5. An antireflectin film as claimed in claim 4, wherein the porous silica has an average particle diameter of 0.3 to 100 nm and a refractive index of 1.2 to 1.4.

TABLE 2

| Example No.*[1] | Highly refractive film | | Lowly refractive film | | $L_1$ (nm) | $L_2$ (nm) | Characteristics | | | | |
|---|---|---|---|---|---|---|---|---|---|---|---|
| | Refractive index $N_1$ | Thickness $D_1$ (nm) | Refractive index $N_2$ | Thickness $D_2$ (nm) | | | Total luminous transmittance (%) | Haze (%) | Surface resistivity (ohm/□) | Surface reflectance (%) | Adhesion*[2] |
| Ex. 1 | 1.70 | 84 | 1.45 | 98 | 562 | 632 | 98.5 | 0.5 | $1 \times 10^8$ | 0.19 | Not marred |
| Ex. 2 | 1.68 | 80 | 1.45 | 93 | 538 | 632 | 93.2 | 0.1 | $9 \times 10^8$ | 0.23 | Not marred |
| Co. 1 | 1.70 | 80 | 1.45 | 93 | 538 | — | 103.2 | 0.0 | $1 \times 10^9$ | 0.19 | Not marred |
| Ex. 3 | 1.65 | 87 | 1.41 | 98 | 556 | 632 | 92 | 0.1 | $5 \times 10^6$ | 0.34 | Not marred |
| Ex. 4 | 1.65 | 86 | 1.43 | 96 | 556 | 632 | 92 | 0.1 | $5 \times 10^6$ | 0.52 | Not marred |
| Ex. 5 | 1.65 | 86 | 1.43 | 96 | 556 | 632 | 92 | 0.1 | $5 \times 10^8$ | 1.82 | Not marred |
| Ex. 6 | 1.63 | 85 | 1.45 | 95 | 550 | 632 | 98.8 | 0.1 | $5 \times 10^8$ | 0.02 | Not marred |
| Ex. 7 | 1.64 | 83 | 1.45 | 96 | 550 | 632 | 93.5 | 0.1 | $5 \times 10^8$ | 1.43 | Not marred |
| Co. 2 | 1.63 | 83 | 1.45 | 96 | 550 | — | 102.6 | 0.0 | $1 \times 10^8$ | 1.01 | Not marred |
| Ex. 8 | 1.63 | 172 | 1.45 | 94 | 550 | 568 | 92.2 | 0.1 | $5 \times 10^7$ | 0.18 | Not marred |
| Ex. 9 | 1.65 | 168 | 1.45 | 95 | 550 | 568 | 78.8 | 0.3 | $5 \times 10^7$ | 0.38 | Not marred |
| Co. 3 | 1.63 | 168 | 1.45 | 95 | 547 | — | 100.5 | 0.0 | $5 \times 10^7$ | 1.64 | Not marred |

Note: *[1]Ex.: Example of the Invention, Co.: Comparative Example
*[2]Adhesion was expressed by the fact whether the surface was marred or not.

What is claimed is:

1. An antireflection film comprising:

a first transparent layer adhered onto a transparent base material, which layer has a refractive index $N_1$ of 1.45 to 2.10 and a thickness $D_1$ (nm) expressed by the following formula (1):

$$0 < D_1 < 0.5 \cdot L_1/N_1 \qquad (1),$$

and a second transparent layer adhered onto the first transparent layer, which has a refractive index $N_2$ at least 0.1

6. An antireflection film as claimed claim 1, wherein the first and second transparent layers comprise at least one material selected from the group consisting of an antimony-doped tin oxide powder and a tin-doped indium oxide powder.

7. An antireflection film as claimed in claim 1, wherein the first and second transparent layers are comprised of finely divided particles having an average particle diameter not larger than 100 nm.

8. An antireflection film as claimed in claim 1, wherein the light absorber comprises at least one coloring material selected from the group consisting of an organic pigment, an inorganic pigment and a dye.

9. An antireflection film as claimed in claim 1, wherein at least one light absorber is also incorporated in said second transparent layer.

10. An antireflection film as claimed in claim 1, wherein a black light absorber is further contained at least in the first transparent layer in an amount such that the light transmittance of the black light absorber-incorporated antireflection film is at least 40% of the light transmittance of the antireflection film having not incorporated therein the black light absorber.

11. An antireflection film comprising:

a first transparent layer adhered onto a transparent base material, which layer has a refractive index $N_1$ of 1.45 to 2.10 and a thickness $D_1$ (nm) expressed by the following formula (3):

$$0.5 \cdot L_1/N_1 \leq D_1 < 0.75 \cdot L_1/N_1 \quad (3),$$

and a second transparent layer adhered onto the first layer, which has a reflective index $N_2$ at least 0.1 smaller than the refractive $N_1$ of the first transparent layer, and a thickness $D_2$ (nm) expressed by the following formula (4):

$$0 < D_2 < 0.5 \cdot L_1/N_2 \quad (4)$$

(in the formulae (3) and (4), $L_1$ is a wavelength in the range of 400 to 800 nm and $N_1$ and $N_2$ are refractive indexes of the first transparent layer and the second transparent layer, respectively);

at least said first transparent layer containing a light absorber having a principal absorbing wavelength $L_2$ (nm) expressed by the following formula:

$$(L_1-200) \leq L_2 \leq (L_1+200)$$

wherein $L_1$ is as defined above, and the light absorption of said second layer does not exceed that of said first layer.

12. An antireflection film as claimed in claim 11, wherein the second transparent layer comprises porous silica.

13. An antireflectin film as claimed in claim 12, wherein the porous silica has an average particle diameter of 0.3 to 100 nm and a refractive index of 1.2 to 1.4.

14. An antireflection film as claimed claim 11, wherein the first and second transparent layers comprise at least one material selected from the group consisting of an antimony-doped tin oxide powder and a tin-doped indium oxide powder.

15. An antireflection film as claimed in claim 11, wherein the first and second transparent layers are comprised of finely divided particles having an average particle diameter not larger than 100 nm.

16. An antireflection film as claimed in claim 11, wherein the light absorber comprises at least one coloring material selected from the group consisting of an organic pigment, an inorganic pigment and a dye.

17. An antireflection film as claimed in claim 11, wherein at least one light absorber is also incorporated in said second transparent layer.

18. An antireflection film as claimed in claim 17, wherein the second transparent layer comprises porous silica.

19. An antireflection film as claimed in claim 3, wherein the porous silica has an average particle diameter of 0.3 to 100 nm and a refractive index of 1.2 to 1.4.

20. An antireflection film as claimed in claim 11, wherein a black light absorber is further contained at least in the first transparent layer in an amount such that the light transmittance of the black light absorber-incorporated antireflection film is at least 40% of the light transmittance of the antireflection film having not incorporated therein the black light absorber.

* * * * *